(12) United States Patent
Baroni et al.

(10) Patent No.: US 6,356,511 B1
(45) Date of Patent: Mar. 12, 2002

(54) LOW DISTORTION RATIO HYDROPHONE

(75) Inventors: Axelle Baroni, Rueil Malmaison;
Claude Beauducel, Henonville;
Georges Constantinou, La Vareene
Saint Hilaire, all of (FR)

(73) Assignee: Institut Francais du Petrole,
Rueil-Malmaison Cedex (FR)

( * ) Notice: Subject to any disclaimer, the term of this patent is extended or adjusted under 35 U.S.C. 154(b) by 0 days.

(21) Appl. No.: 09/616,065

(22) Filed: Jul. 13, 2000

(30) Foreign Application Priority Data

Jul. 13, 1999 (FR) ............................................. 99 09217

(51) Int. Cl.[7] .......................... H04R 17/00; H04R 1/44
(52) U.S. Cl. ....................................... 367/163; 367/165
(58) Field of Search ................................ 367/157, 163, 367/165, 160, 164

(56) References Cited

U.S. PATENT DOCUMENTS

| | | | | |
|---|---|---|---|---|
| 4,431,873 A | * | 2/1984 | Dunn et al. ................. | 367/165 |
| 4,600,855 A | * | 7/1986 | Strachan ..................... | 310/338 |
| 4,751,419 A | * | 6/1988 | Takahata .................... | 310/324 |
| 4,833,659 A | * | 5/1989 | Geil et al. .................. | 367/155 |
| 5,541,894 A | | 7/1996 | Erath ......................... | 367/157 |
| 5,677,894 A | | 10/1997 | Erath ......................... | 367/160 |

FOREIGN PATENT DOCUMENTS

FR 2748183 10/1997 ............ H04R/1/44

* cited by examiner

Primary Examiner—Ian J. Lobo
(74) Attorney, Agent, or Firm—Antonelli, Terry, Stout & Kraus, LLP

(57) ABSTRACT

Very low distortion hydrophone comprising at least one pair of sensitive elements (6 and 8) of piezoelectric type (for example and not limitatively), associated with at least one of the opposite flexible faces of a housing (1) formed by assembling cups (2 and 3) with rigid edges. The opposite faces of one of the discs, (6), are provided with electrodes over the total surface thereof. On the other hand, at least one of electrodes (9a and 9b) associated with the opposite faces of second disc (8) only covers one or more portions (an annular strip for example) of each of these faces in an external zone of each cup (2, 3) more subjected to nonlinear stresses. Electrodes (7 and 9) of the two sensitive discs (6 and 8) are interconnected so as to make the difference between the electric signals generated by the two discs in response to the pressures applied, with the effect, experimentally verified, that the distortion resulting from this layout, notably due to a second harmonic (2), is practically suppressed. The hydrophone can be used for geophysics, detection or locating, etc.

20 Claims, 2 Drawing Sheets

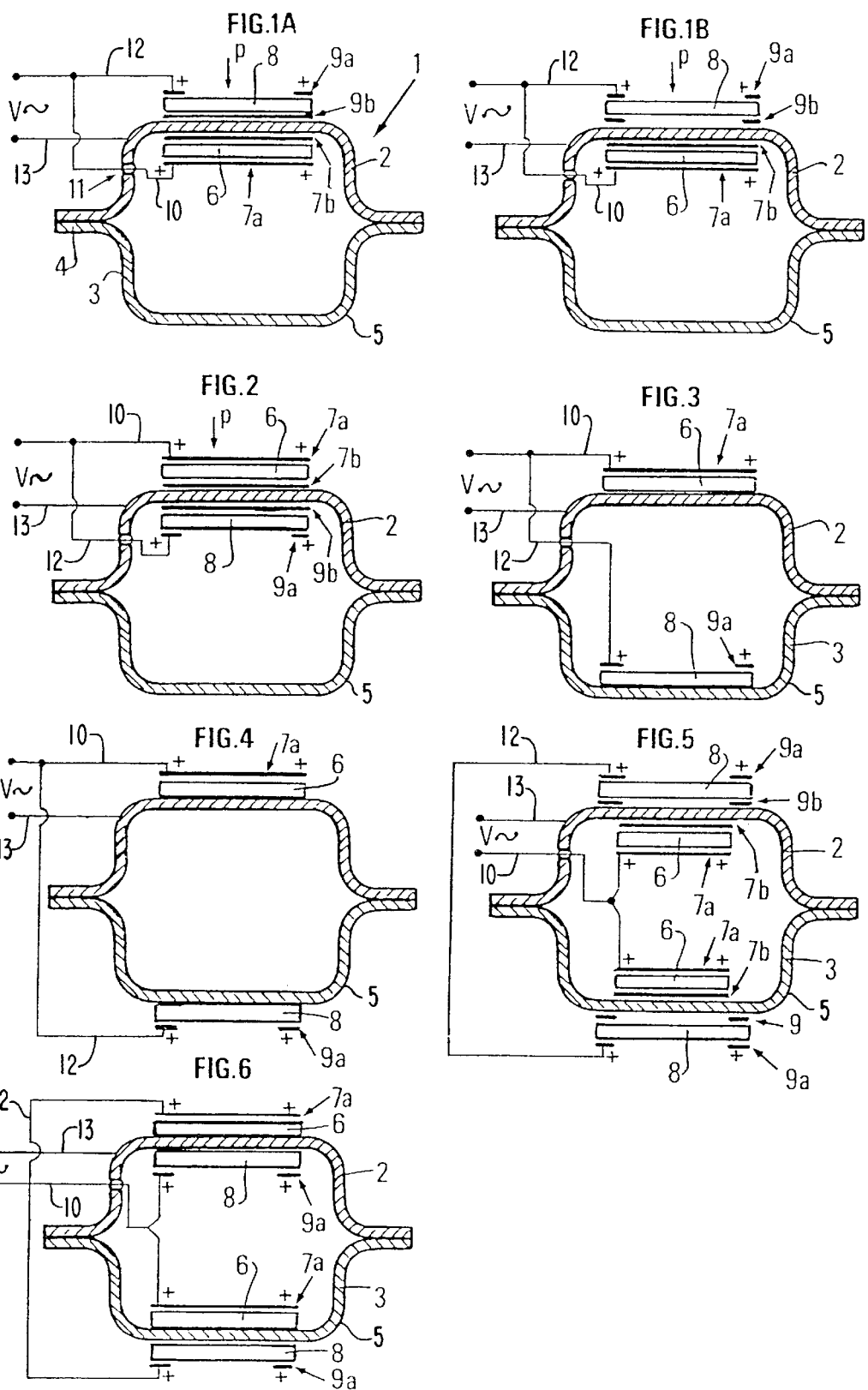

LOW DISTORTION RATIO HYDROPHONE

BACKGROUND OF THE INVENTION

1. Field of the Invention

The present invention relates to a low distortion ratio hydrophone of piezoelectric type for example.

2. Description of the Prior Art

The prior art in the field of piezoelectric hydrophones is notably illustrated in French Pat. Nos. 1,556,971; 2,122,675; 2,733,831 and 2,748,183, U.S. Pat. Nos. 3,970,878; 4,336,639; 4,926,397; 5,541,894; 5,815,466 and 5,677,894, and in French Patent Application 99/05,289.

It is well-known to form hydrophones by assembling elements sensitive to pressure variations, consisting each of a disc made of a piezoelectric ceramic associated with a pair of electrodes arranged on either side. Each disc is attached onto a flexible support such as a diaphragm-4 one of the faces thereof being exposed to the pressure variations to be measured.

The flexible support is for example a diaphragm supported by a rigid housing or by the flexible central part of a cup whose periphery is reinforced and rigid, resting against an identical cup, itself carrying one or more sensitive elements, the two cups defining a housing. The electrodes of the two sensitive elements are electrically interconnected so as to provide compensation for the parasitic effects due to accelerations.

When the outside static pressure increases, the two plates bend until they rest against each other. The space between them is so selected that their maximum deformation, when they are pressed against each other, remains within elastic deformation limits. The pickup is thus protected against accidental overpressures. The housing thus formed can be coated with a protective layer made of a material transparent to acoustic waves.

The sensitive elements can be externally fastened to the housing and covered with a protecting coating (such as a varnished araldite layer) so as to maintain a sufficient electric insulation between the electrodes. The sensitivity of this type of hydrophone is good and does not vary much (less than 10% for a static pressure of 10 Mpa for example) with the hydrostatic pressure.

According to another well-known layout, the sensitive elements are fastened to the inner faces of the cups and therefore inside the housing, which provides good protection against the outside medium but they may thus be damaged through crushing when the hydrostatic pressure increase presses them against each other by bending the plates. The sensitivity of hydrophones with sensitive elements inside the housing is lower and it greatly decreases when the hydrostatic pressure increases, a phenomenon that can be attributed to their being fastened to a face that becomes convex.

A common drawback of symmetrically connected hydrophones with a single pair of sensitive elements, both inside or outside the housing, is the relatively great variation of their capacitance with the hydrostatic pressure. Capacitance increases with the pressure when the sensitive elements are inside, whereas capacitance decreases when the sensitive elements are outside.

It is also well-known to combine the previous two types in a hydrophone with two diaphragms defining a closed housing, each one carrying a pair of sensitive elements, one outside the housing, the other inside, the two pairs being electrically interconnected in parallel so as to compensate for certain drawbacks inherent in the two layout modes mentioned above, but this solution is relatively expensive.

French Patent Application 99/05,289 mentioned above describes a hydrophone comprising a closed housing defined by two cups with a flexible central part and at least two piezoelectric sensitive elements of different sizes associated each with electrodes and electrically interconnected, these two sensitive elements being respectively fastened to the diaphragms, one outside the housing, the other inside the housing. Such a hydrophone with a single pair of sensitive elements combines the advantages of the prior hydrophones. The inter-electrode capacitance is substantially constant within a wide pressure range and the sensitivity is of the same order of magnitude as that obtained with a symmetrical connection outside the housing.

The aforementioned U.S. Pat. No. 5,677,894 describes a piezoelectric type hydrophone comprising an elongate housing with opposite flexible diaphragms each carrying externally a piezoelectric crystal made of several parts separated from one another: a central part and two lateral parts arranged symmetrically and electrically connected to the central part. A rigid element (a rod) is inserted between the two diaphragms so that application of a pressure causes the central parts of the sensitive crystals to become convex and their lateral parts to become concave. The crystals are so sized that, by combination of the electric charges due to these opposite effects, distortion is reduced.

SUMMARY OF THE INVENTION

The hydrophone according to the invention comprises a housing including at least one diaphragm and at least one pair of sensitive elements (of piezoelectric, optical fiber type, etc.) in contact with the housing, which generate signals indicating the generated stresses of at least one diaphragm of the housing, in response to pressure variations in the outside medium.

The first sensitive element of each pair is placed in contact with a first diaphragm portion undergoing essentially linear deformations, and in that the second sensitive element of each pair is in contact with at least a second diaphragm portion undergoing essentially less linear deformations, the respective areas of the first and second portions are selected and the signals produced by the two sensitive elements of each pair are combined so as to substantially compensate for the distortion affecting the resulting signals produced in operation by the hydrophone.

The housing of the hydrophone comprises for example at least one cup with a flexible central part and a more rigid external part, the first sensitive element of each pair generates signals indicating the essentially linear deformations affecting a flexible central part of a diaphragm, and the second sensitive element of each pair generates signals indicating the essentially less linear deformations affecting a more rigid external portion of the diaphragm.

In the case for example where the sensitive elements of each pair are of a piezoelectric type with each two opposite faces and electrodes associated with these opposite faces, at least a first electrode of the second sensitive element of the pair covers only a portion of the face of the second sensitive element against which the second sensitive element presses (an external portion for example), the second electrode of the second sensitive element covering substantially the total face against which the second sensitive element presses or only an external portion of each of the faces thereof.

According to an embodiment, the housing includes a flexible diaphragm and the two sensitive elements of the same pair are respectively fastened to the opposite faces of the diaphragm.

According to another embodiment, the housing includes two flexible diaphragms, the two sensitive elements of the same pair are respectively fastened to either corresponding faces (both external or internal), or to different faces of these two flexible diaphragms.

According to another embodiment, the hydrophone comprises two pairs of sensitive elements respectively fastened to the two flexible diaphragms, the corresponding sensitive elements of the two pairs of sensitive elements are respectively in contact with either the identical faces or with the opposite faces of the two diaphragms.

According to another embodiment, the two sensitive elements of at least one pair of sensitive elements are different in size and, if they are piezoelectric sensitive elements, at least one of the electrodes associated with the larger sensitive element covers only an external portion of the corresponding face.

The portions of the faces covered by the electrodes on each sensitive element of a pair are preferably dimensioned so as to compensate for the distortion.

According to another embodiment, the housing comprises at least one circular flexible diaphragm, the sensitive elements of each pair are discs made sensitive, one on a central portion, the other on a peripheral part.

As the case may be, the sensitive elements of each pair are either directly interconnected or connected by means of an adapter element.

Manufacture of the hydrophone defined above is simplified. In the case for example where piezoelectric type sensitive elements are used, it is not necessary to cut up crystals to form each peripheral compensation sensitive element. The crystal is entire but only the peripheral portions selectively metallized on both sides contribute to creating in operation electric charges taking part in the desired distortion compensation and reduction. When the discs of each pair are fastened to the opposite faces of the same flexible diaphragm, they rigidify the diaphragm. This is useful for limiting its curvature towards the inside of the housing when the outside hydrostatic pressure increases as a result of an immersion depth variation.

It is experimentally verified that the residual distortion affecting the signals produced through this layout, notably the distortion due to the second harmonic of the signals, is greatly reduced and becomes practically zero if the dimensions of the (or of each of the two) peripheral electrode(s) of each first sensitive element are optimized.

BRIEF DESCRIPTION OF THE DRAWINGS

Other features and advantages of the hydrophone according to the invention will be clear from reading the description hereafter of non limitative examples, with reference to the accompanying drawings wherein:

FIGS. 1a, 1b respectively show two variants of a first embodiment of the hydrophone with a pair of sensitive elements fastened on either side of the same diaphragm, FIG. 2 shows a variant of the assembly mode of FIGS. 1a, 1b where the sensitive elements are inverted, FIG. 3 shows a second embodiment where the two sensitive elements of the pair are respectively in contact with the two cups of a housing, one against an external face, the other against an internal face, FIG. 4 shows a variant of the assembly mode of FIG. 3 where the two sensitive elements of a pair are respectively in contact with the two cups of a housing, both outside the housing (or possibly both inside), FIG. 5 shows another embodiment comprising two pairs of sensitive elements allowing the sensitivity of the hydrophone to be increased, FIG. 6 shows a variant of the assembly mode of FIG. 5 where the layout of the sensitive elements of a pair in relation to one of the diaphragms is inverted in relation to the layout of the other pair in relation to the other diaphragm.

DETAILED DESCRIPTION OF THE PREFERRED EMBODIMENTS

Figure 7:
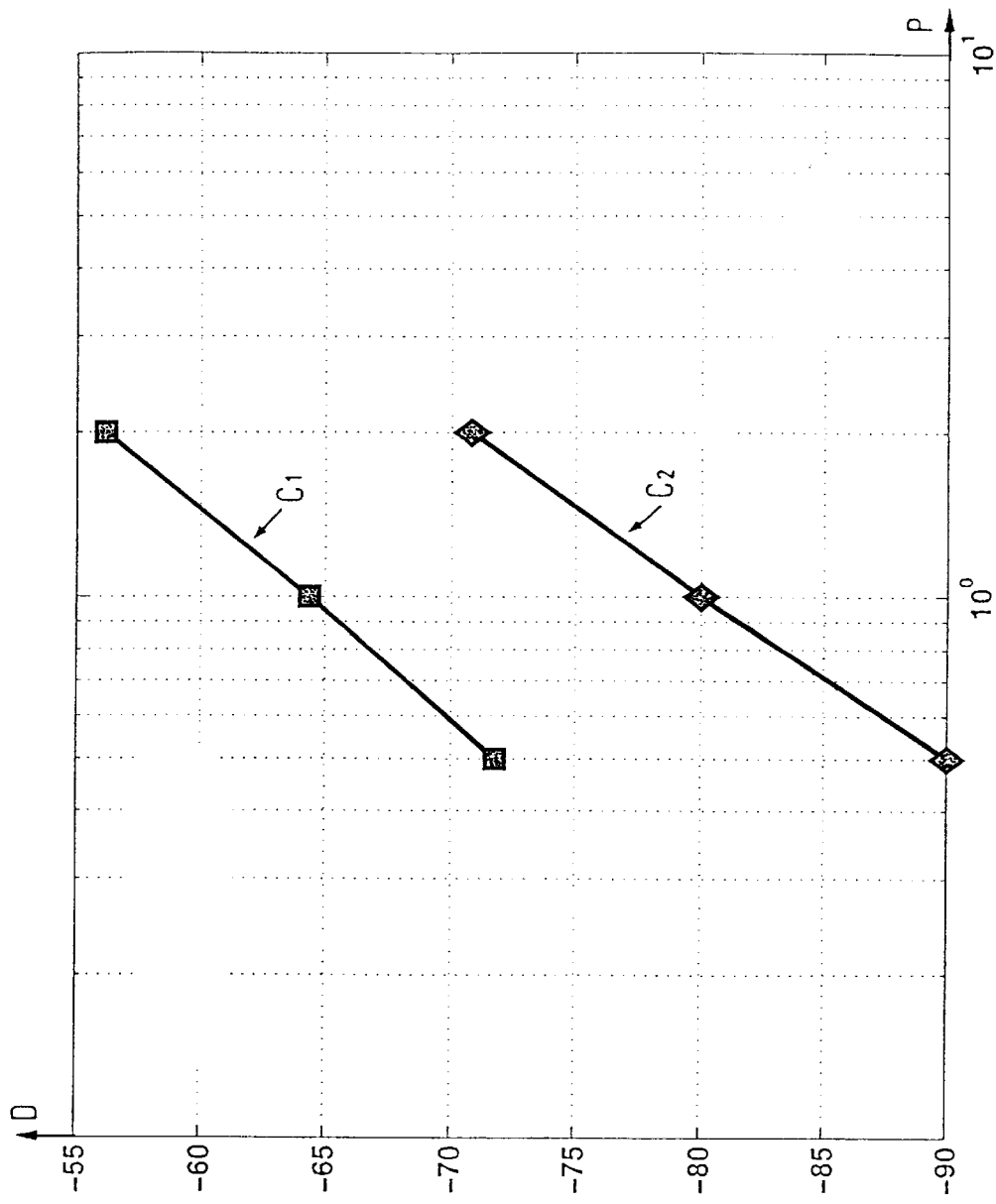
FIG. 7 shows comparative variation curves of the distortion as a function of the acoustic pressure, obtained with a hydrophone of a well-known type and with the hydrophone according to the invention.

The hydrophone comprises a housing I (FIGS. 1–6) having for example two identical cups 2, 3 arranged symmetrically, with each including a plate or diaphragm 4 and a curved edge 5, the two cups resting against each other on the periphery thereof. The two cups can be machined or made by drawing.

A sensitive element 6 such as a disc made of piezoelectric ceramic associated with two electrodes 7a and 7b is fastened (FIG. 1) to the inner face of the more flexible central part of diaphragm 4 of cup 2 for example. Another disc-shaped sensitive element 8 is fastened to the outer face of diaphragm 4 of cup 2. It is similarly associated with electrodes 9a and 9b. Electrode 9b covers the total face in contact with cup 2. Electrode 9a covers only one or more external portions of the opposite face. It is for example annular in shape. The central part of disc 8 (on the side opposite cup 2) is thus bare of electrodes and does not contribute to the formation of the electric potential difference in response to stresses that can be applied thereto. These partial electrodes are for example formed by masking the central part of the faces of disc 8 and metallization of the uncovered external portions.

The + sign in the figures shows the (purely indicative and non limitative) direction of polarization of the piezoelectric ceramics used in all the embodiments described.

According to an embodiment, both faces of each disc can also be metallized, the external portions alone forming electrode 9a and taking part in the formation of the electric potential difference, being then simply separated (electrically insulated) from the central 10 part.

According to the variant of FIG. 1b, the two electrodes are arranged symmetrically. Electrode 9b is also partial and covers only surface portions such as the opposite electrode 9a, possibly the same ones.

An electrical conductor 10 associated with electrode 7a of inner sensitive element 6 runs through the wall of housing I through a sealed duct such as a glass bead II for example. Electrical conduction 10 is electrically connected to a conductor 12 associated with electrode 9a of sensitive element 8. The opposite electrodes 7b and 9b of these sensitive elements are in electric contact with cups 2 and 3 and with another electrical conductor 13 welded to housing 1. If the housing is made from an insulating material, electric interconnection of electrodes 7b and 9b is of course directly provided by distinct electric wires.

The two sensitive elements 6 and 8 are positioned against cups 2 and 3 according to their polarization so that their faces which are not in contact with diaphragm 4 develop opposite electrical potential difference in response to a flexion thereof when a pressure P is applied to the hydrophone.

Electrodes 7a and 7b covering all of the two opposite faces of sensitive element 6 receive all of the contribution of the central part subjected to relatively linear stresses. The metallized active part of the sensitive element 8 of each pair is in contact with a zone that is closer to the stiffer edge of each cup 2, 3 which is more subjected to non-linear stresses than the central zone. The active part closer to the stiffer edge therefore generates an electric potential difference with a greater distortion. The amplitude of the signal the active part closer to the stiffer edge generates is generally lower (because its surface area is for example smaller than that of central element 6). It is observed that the amplitudes of the harmonics of the two signals (notably the second harmonic) can be substantially the same if the active areas of the two sensitive elements are optimized in relation to one another. Since the difference is made between the signals because of the mode of interconnection of the electrodes, the resulting signal is weaker than the signal that would be produced by first central sensitive element 6 alone, but it is almost totally free from any harmonic frequency.

According to the variant of FIG. 2, the two piezoelectric discs are inverted in position relative to the embodiment of FIG. 1A. Sensitive element 6 is in contact with the external face of cup 2, whereas sensitive element 8, provided with at least one electrode 9a covering partly one of the faces of element 8, is fastened to the same diaphragm but inside housing 1. The same polarizations of sensitive elements 6 and 8 and the previous electrode interconnections are used.

According to the embodiment of FIGS. 3 and 4, the two sensitive elements are respectively, associated with the two cups 2 and 3 of the hydrophone. In the embodiment of FIG. 3, one of the sensitive elements, 6 for example, is placed in contact with the outer face of one of the cups, 2, the other sensitive element, 8 for example, is in contact with the inner wall of the other cup 3, whereas in the embodiment of FIG. 4, the sensitive elements are both arranged outside the hydrophone housing.

According to the embodiment of FIGS. 5 and 6, the hydrophone comprises two pairs of sensitive elements 6 and 8, these two pairs being respectively fastened to the two diaphragms 4 of cups 2 and 3, with a sensitive element, 6 for example, of each pair fastened inside, and a sensitive element, 8 for example, fastened outside, according to one or the other of the arrangements shown in FIGS. 1a, 1b and 2.

Similarly, electrodes 7a, 7b, 9a and 9b of the two pairs of sensitive elements are connected in parallel so as to suppress the distortion as previously.

In any case, the width of each partial electrode is optimized for each sensitive element 8 in order to obtain the desired distortion compensation effect.

In all the previous embodiments, identical sensitive elements 6 and 8 can be used, which differ only in their electrodes, totally metallized for some and partially for the others. It is however possible to use piezoelectric discs of different sizes. Disc 8 with partial electrodes 9 is for example larger, so that a larger portion of its surface is in contact with peripheral zones subjected to greater non-linear stresses, so as to reinforce the distortion in the signal produces in response to the pressures exerted and to improve the distortion compensation in the resulting signal.

It is also possible, without departing from the scope of the invention:

to change the shape of the diaphragms and the shape of the associated sensitive elements, to change the location of the sensitive elements on the faces of the or of each diaphragm (symmetrical or unsymmetrical arrangement for example), or to select another shape for electrodes 9a and 9b advantageously deposited by selective metallization on the compensation sensitive elements 8 of each pair, provided that the layouts selected allow, as described above, to combine the electrical potential differences they generate with distortion compensation.

In the embodiments described, piezoelectric sensitive elements are used, whose polarization and metallized areas are such that their electrodes can be directly interconnected to reduce the distortion. If this condition is not met, it is however possible to obtain the desired compensation by connecting the electrodes of sensitive elements 6 and 8 of each pair by means of an adapter element such as an electronic circuit (not shown).

Comparative curves C1 and C2 of FIG. 7 show the variations of residual distortion D as a function of the acoustic pressure for two hydrophones. The first curve, C1, is obtained with a hydrophone of a well-known structure including two identical piezoelectric sensitive elements metallized on the two opposite faces thereof and in contact with the outer faces of a housing. The other curve, C2, obtained with the hydrophone according to the invention, clearly shows a significant distortion reduction.

Embodiments of a hydrophone where the sensitive elements used are of piezoelectric type have been described. This is of course not limitative.

Any other type of transducer element capable of reproducing the deformations or stresses in contact with a surface portion of a diaphragm could also be used without departing from the scope of the invention, for example transducer elements with optical fibers selectively placed in contact with diaphragms or portions of diaphragms.

What is claimed is:

1. A hydrophone comprising a housing including at least one diaphragm and at least one pair of sensitive elements in contact with the at least one diaphragm, each sensitive element being provided with electrodes on opposite faces thereof for collecting signals representative of stresses generated in the sensitive element by a deformation of the least one diaphragm in response to pressure variations in an outside medium, a first sensitive element of each pair being electrically coupled with one of the electrodes coupled to a first diaphragm portion essentially undergoing linear deformations, and a second sensitive element of each pair being electrically coupled with one of the electrodes coupled to at least a second diaphragm portion essentially undergoing less linear deformations and surface areas of the first and second portions being selected to produce output electrical signals from the electrodes which are combined so that a harmonic in the combined output signals produced during operation of the hydrophone is substantially eliminated.

2. A hydrophone as claimed in claim 1, wherein the sensitive elements are of a piezoelectric type.

3. A hydrophone as claimed in claim 2, wherein the sensitive elements each have two opposite faces and electrodes associated with the opposite faces, at least a first electrode of the second sensitive element of the pair of sensitive elements covering only a portion of a face of the element in contact therewith.

4. A hydrophone as claimed in claim 3, wherein a second electrode of the second sensitive element substantially covers all of a face in contact therewith.

5. A hydrophone as claimed in claim 4, wherein the first and second electrodes of the second sensitive element each cover only an external portion of respective faces of the second sensitive element in contact therewith.

6. A hydrophone as claimed in claim 1, wherein the housing comprises a flexible diaphragm, the two sensitive elements of the same pair being respectively fastened to opposite faces of the diaphragm.

7. A hydrophone as claimed in claim 1, wherein the housing comprises two flexible diaphragms, the two sensitive elements of the same pair being respectively fastened to corresponding faces of the two flexible diaphragms.

8. A hydrophone as claimed in claim 1, wherein the housing comprises two flexible diaphragms, the two sensitive elements of the same pair being respectively fastened to different faces of the two flexible diaphragms.

9. A hydrophone as claimed in claim 8, comprising two pairs of sensitive elements respectively fastened to the two flexible diaphragms.

10. A hydrophone as claimed in claim 9, wherein corresponding sensitive elements of the two pairs of sensitive elements are respectively in contact with identical faces of the two diaphragms.

11. A hydrophone as claimed in claim 9, wherein corresponding sensitive elements of the two pairs of sensitive elements are respectively in contact with opposite faces of the two diaphragms.

12. A hydrophone as claimed in claim 1, wherein the first and second sensitive elements of at least one pair of sensitive elements are different in size.

13. A hydrophone as claimed in claim 2, wherein the first and second sensitive elements of the at least one pair of sensitive elements are different in size, at least one of the electrodes associated with a larger sensitive element covers only an external portion of a face in contact therewith.

14. A hydrophone as claimed in claim 2, wherein the portions of each first electrode and second sensitive element are sized and have a different size to compensate for distortion.

15. A hydrophone as claimed in claim 2, wherein the housing comprises at least one circular flexible diaphragm, the sensitive elements of each pair being discs respectively sensitive on a central portion, and on a peripheral part.

16. A hydrophone as claimed in claim 1, wherein the sensitive elements of each pair are optical fiber sensitive elements.

17. A hydrophone as claimed in claim 1, wherein sensitive elements of each pair are directly electrically connected.

18. A hydrophone as claimed in claim 1, wherein the sensitive elements of each pair are electrically connected by an adapter element.

19. A hydrophone as claimed in claim 1, wherein the housing comprises at least one cup having a central flexible part and a less flexible peripheral part, the first sensitive element of each pair generating signals representing essentially linear deformations affecting the flexible central flexible part of a cup of the first sensitive element, and the second sensitive element of each pair generating signals representing essentially less linear deformations affecting the less flexible peripheral part of the cup.

20. A hydrophone as claimed in claim 1, wherein the housing comprises a flexible diaphragm, the two sensitive elements of each pair being respectively fastened to opposite faces of the diaphragm.

* * * * *